(12) United States Patent  
Hsu

(10) Patent No.: US 9,104,248 B2  
(45) Date of Patent: Aug. 11, 2015

(54) ELECTRONIC DEVICE

(71) Applicants: Inventec (Pudong) Technology Corporation, Shanghai (CN); INVENTEC CORPORATION, Taipei (TW)

(72) Inventor: Ming-Hsien Hsu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 368 days.

(21) Appl. No.: 13/785,182

(22) Filed: Mar. 5, 2013

(65) Prior Publication Data

US 2014/0092008 A1 Apr. 3, 2014

(30) Foreign Application Priority Data

Sep. 29, 2012 (CN) .......................... 2012 1 0374600

(51) Int. Cl.
*G06F 3/041* (2006.01)
*G06F 3/02* (2006.01)
*G06F 1/16* (2006.01)

(52) U.S. Cl.
CPC ............ *G06F 3/0227* (2013.01); *G06F 1/1615* (2013.01)

(58) Field of Classification Search
CPC .............................. G06F 3/0227; G06F 1/1615
USPC ........................... 345/156; 361/679.27–679.3
See application file for complete search history.

(56) References Cited

U.S. PATENT DOCUMENTS

| 2003/0221876 | A1* | 12/2003 | Doczy et al. ............... 178/18.01 |
| 2012/0224316 | A1* | 9/2012 | Shulenberger ........... 361/679.09 |
| 2013/0107445 | A1* | 5/2013 | Reber et al. .............. 361/679.41 |
| 2013/0154920 | A1* | 6/2013 | Radin et al. .................... 345/156 |

* cited by examiner

*Primary Examiner* — Jonathan Boyd
(74) *Attorney, Agent, or Firm* — Locke Lord LLP; Tim Tingkang Xia, Esq.

(57) ABSTRACT

An electronic device includes a portable computing device and a peripheral device. The portable computing device includes a control center and a first sensor, and whereas the peripheral device includes a base, a frame body and a lock set. An input module is located in the base and the frame body, having a closed position and an uncovered position with respect to the base, is pivotally connected to the base. The lock set, having a released position and a locked position, is located in the frame body and includes a second sensor. The control center detects a relative location between the first sensor and the second sensor and uses the relative location for controlling the statuses of the input module and the portable computing device.

10 Claims, 3 Drawing Sheets

ELECTRONIC DEVICE

CROSS-REFERENCE TO RELATED APPLICATIONS

This non-provisional application claims priority under 35 U.S.C. §119(a) on Patent Application No(s). 201210374600.5 filed in China on Sep. 29, 2012, the entire contents of which are hereby incorporated by reference.

BACKGROUND OF THE INVENTION

1. Technical Field of the Invention

The disclosure relates to a peripheral device and, specifically, a peripheral device with an input module.

2. Description of the Related Art

In recent years, with the rapid advancement in technology, manufacturing technology for electronic products develops progressively as well. In order to emphasize the portability of electric devices, electronic devices are designed to be light weighed, thinner, and smaller. With respect to the progress of computers, for example, portable laptop computers with relative small size were developed after years since the first desktop computer was released, and, by comparing with the former laptops, the size of laptops available nowadays is relatively compact. Moreover, in order to meet the demand of consumers in favor of compact electronic devices, tablet computers were developed that are further smaller than the laptop computers. Although a tablet computer does not necessary work with peripheral components such as a keyboard and a mouse, the tablet computer has an expansion slot which allows peripheral components to plug in.

Take a docking station with input function as an example. The docking station has a keyboard that allows users to input commands once the tablet computer is plugged into the docking station. However, complicated processes must be done in order to establish a connection between the keyboard of the docking station and the tablet computer, therefore, posing inconvenience to users.

SUMMARY OF THE INVENTION

The electronic device of the disclosure includes a portable computing device and an peripheral device. The portable computing device includes a control center and a first sensor whereas the peripheral device having a clam shell design includes a base, a frame body and a lock set. An input module is located in the base and the frame body, having a closed position and a uncovered position with respect to the base, is pivoted to the base. The lock set, having a released position and a locked position that allow the portable computing device to be detached from or be secured to the frame body respectively, is located in the frame body and includes a second sensor. The control center detects the relative location between the first sensor and the second sensor as a basis to monitor the operable stage of the input module and the portable computing device.

The explanation stated above and the following descriptions are exemplary embodiments only, and are not intended to limit the scope, applicability or configuration of the disclosure in any way. Rather, the following descriptions provide convenient illustrative examples for implementing the disclosure in further details.

BRIEF DESCRIPTION OF THE DRAWINGS

The disclosure will become more fully understood from the detailed description given herein below by way of example with reference to the accompanying drawings, and thus are not limitative of the disclosure, and wherein.

DETAILED DESCRIPTION

Figure 1:
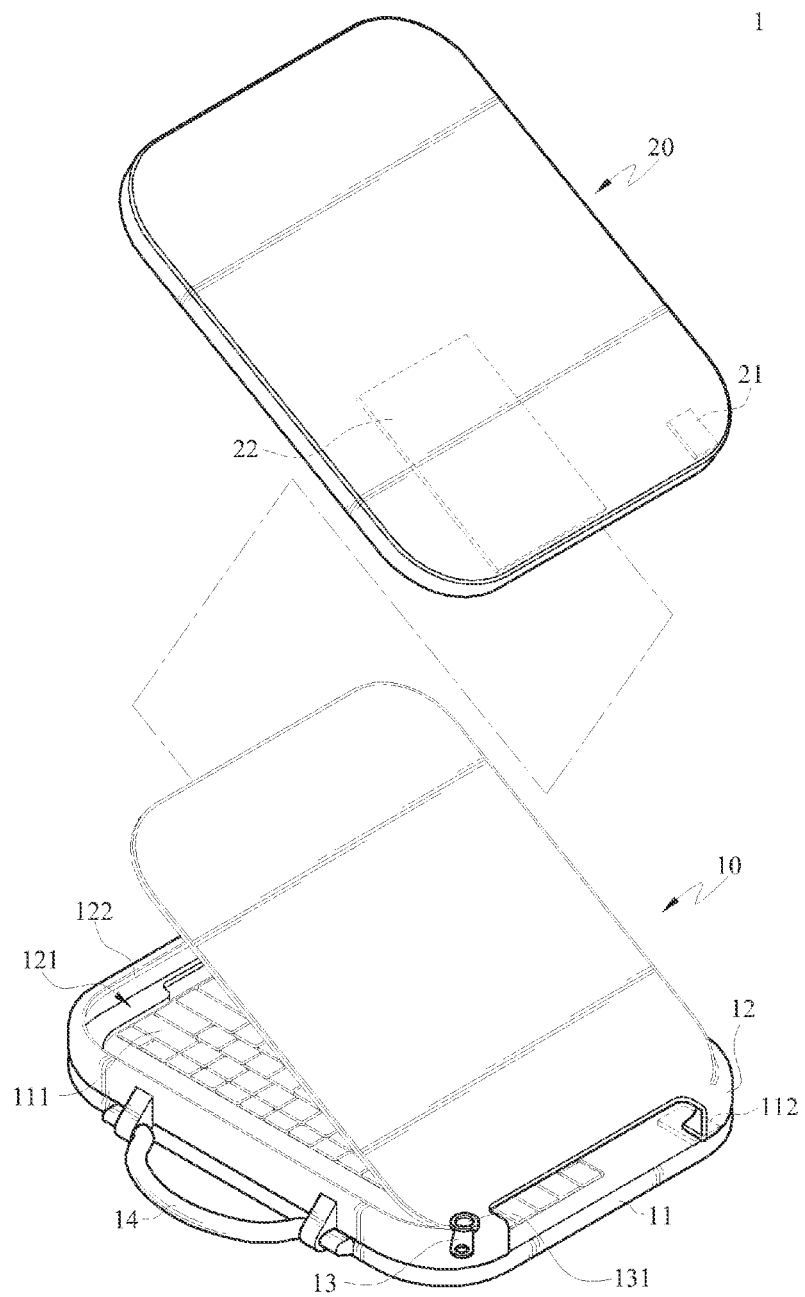
FIG. 1 is a schematic view a portable computing device and a peripheral device according to an embodiment.
Figure 2:
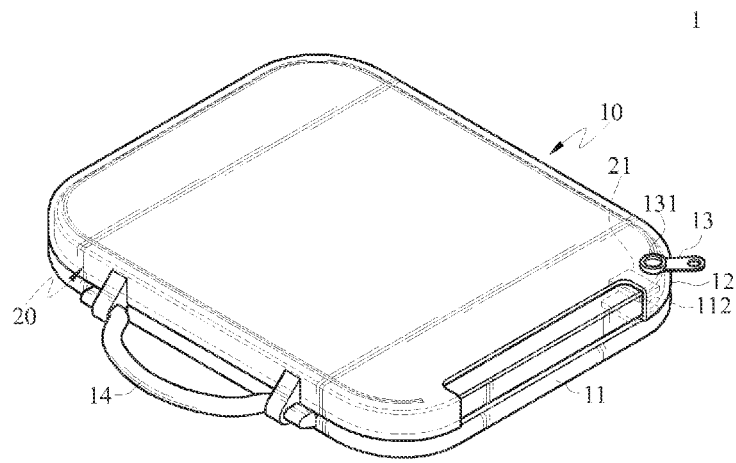
FIG. 2 is a schematic view of the portable computing device secured inside the peripheral device in FIG. 1.
Figure 3:
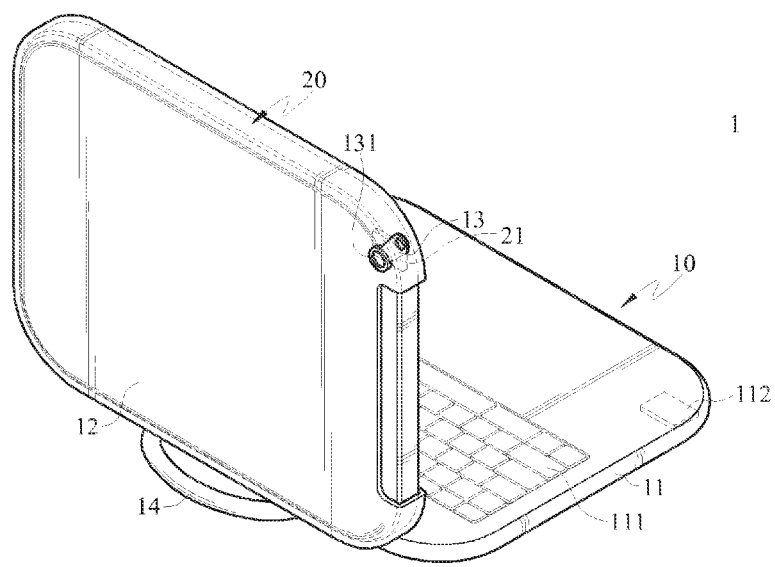
FIG. 3 is a schematic view of the peripheral device in an opened position with respect to the portable computing device in FIG. 2.
Figure 4:
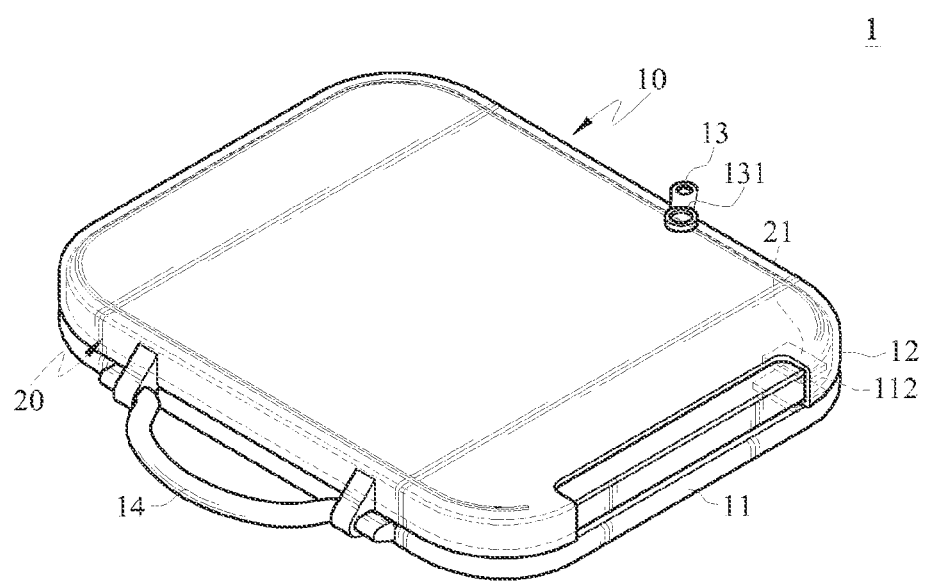
FIG. 4 is schematic view of a lock set in FIG. 2 in a released position.

With reference to FIG. 1 to FIG. 4, FIG. 1 is a schematic view a portable computing device and a peripheral device according to an embodiment; FIG. 2 is a schematic view of the portable computing device secured inside the peripheral device in FIG. 1; FIG. 3 is a schematic view of the peripheral device in an opened position with respect to the portable computing device in FIG. 2, and FIG. 4 is schematic view of a lock set in FIG. 2 in a released position.

An electronic device 1 includes a portable computing device 20 and a peripheral device 10. The portable computing device 20 is, for example, a tablet computer, and in some embodiments, the portable computing device 20 is a smart phone.

The portable computing device 20 includes a control center 22 and a first sensor 21 wherein the control center 22 is, for example, a single controller or processor, and the first sensor 21 is, for example, a sensor having a magnet, a sensor for sensing magnetic force, or a RFID (Radio-Frequency Identification) tag.

The peripheral device 10 includes a base 11, a frame body 12 and a lock set 13. An input module 111 is located in the base 11 and the input module 111 is, for example, a keyboard module. A handle 14 is pivotally connected to the base 11 for ease of carrying the peripheral device 10.

The frame body 12 is pivotally connected to the base 11, and is able to pivot relatively to the base 11 to a closed position (as illustrated in FIG. 2) and a uncovered position (as illustrated in FIG. 3). The frame body 12 has a holding slot 121 and an opening 122 which leads to the holding slot 121. The portable computing device 20 can be inserted into and removed out of the frame body 12. Moreover, the portable computing device 20 can be inserted in the holding slot 121 of the frame body 12 through the opening 122.

The lock set 13, located near the edge of the opening 122 of the frame body 12 is, for example, a zipper and can be moved along the edge of the frame body 12 between a released position (as illustrated in FIG. 1) and a locked position (as shown in FIG. 2). When the lock set 13 is in the released position (as illustrated in FIG. 1), the opening 122 can be exposed and allows the portable computing device 20 to be moved out of the holding slot 121 of the frame body 12 or to be placed into the holding slot 121 of the frame body 12. When the portable computing device 20 is in the holding slot 121 and the lock set 13 is in the locked position (as shown in FIG. 2), the opening 122 is closed and secures the portable computing device 20 in the holding slot 121 of the frame body 12. The lock set 13 includes a second sensor 131, which may include a magnet or a RFID tag and is a counterpart of the first sensor 21.

In this and some embodiment, the base 11 includes a third sensor 112, which includes a magnet or a RFID tag and is a counterpart of the first sensor 21. By means of utilizing the first sensor 21 of the portable computing device 20, the second sensor 131 and the third sensor 112 of the peripheral device 10 together, the control center 22 is able to collect data of the relative location of the first sensor 21 with respect to the second sensor 131 as well as that of the first sensor 21 with respect to the third sensor 112. The relative locations is used for determining and controlling the statuses of the input module 111 and the portable computing device 20. Detailed explanation on how the control center 22 determines and controls the statuses of both the input module 111 and the portable computing device 20 according to the relative locations of the first sensor 21 with respect to the second sensor 131 and that of the first sensor 21 to the third sensor 112, will be described in the following paragraphs.

With reference to FIG. 1 and FIG. 2, users can place the portable computing device 20 inside the frame body 12 and move the lock set 13 to its locked position (with the zipper tracks secured together and the opening 122 closed) such that the first sensor 21 and the second sensor 131 overlap each other. The first sensor 21 transmits signals to the control center 22 when detecting that the second sensor 131 is adjacent to it. With the signals of the relative locations between the first sensor 21 and the second sensor 131, the control center 22 can determine that the lock set 13 is in the locked position. If the lock set 13 is in the locked position, the control center 22 labels the status of the portable computing device 20 as "installed" and instructs the portable computing device 20 to connect to the input module 111 through wireless connection.

While the portable computing device 20 is labeled as "installed," through the first sensor 21, the control center 22 further collects the relative locations of the first sensor 21 with respect to the third sensor 112. The first sensor 21 transmits signals to the control center 22 when detecting that the third sensor 112 is adjacent to it (as illustrated in FIG. 2). As a result, based on the signals, the control center 22 determine that the frame body 12 is in a closed position, and then, the control center 22 issues instructions through the wireless connection to change the statuses of the input module 111 and the portable computing device 20 to a standby mode for energy efficient use.

When the stage of the portable computing device 20 is labeled as "installed" and, then, users change the frame body 12 from a closed position to an uncovered position (as illustrated in FIG. 3), the first sensor 21 detects the departure of the third sensor 112, and then, transmits signals of the relative position to the control center 22. With inputs of the relative positions between the first sensor 21 and the third sensor 112, the control center 22 concludes that the frame body 12 is in the uncovered position. The control center 22 thus controls the portable computing device 20 to run an initiate procedure, and, through the wireless connection between the portable computing device 20 and the input module 111, controls the input module 111 to remain in a power-on stage. In some embodiments, the initial procedure executed by the portable computing device 20 is a system boot program or an unlocking procedure, and the power-on stage means that the input module 111 is in a state ready to accept inputs from users.

If users move the lock set 13 away from the locked position (with the zipper tracks unsecured), the first sensor 21 detects the second sensor 131 being away, and then, transmits signals of the relative position to the control center 22. Having inputs of the relative positions between the first sensor 21 and the second sensor 131, the control center 22 concludes that the lock set 13 is in a released position. Consequently, the control center 22 send instructions to change the status of the portable computing device as "separated" and, then, terminates the wireless connection between the portable computing device 20 and the input module 111.

According to the embodiments of the electronic device described above, the electronic device relies on the incorporation among the first sensor of the portable computing center and the second sensor and the third sensor of the peripheral device to provide the control center with the relative location between the first sensor and the second sensor and the relative location between the first sensor and the third sensor. The relative locations are used for controlling statuses of the input module and the portable computing device and therefore, for improving the ease of use between the tablet computer and the peripheral device.

What is claimed is:

1. An electronic device, comprising:
a portable computing device including a control center and a first sensor; and
a peripheral device including:
a base where an input module is located;
a frame body pivotally connected to the base, having a closed position and a uncovered position with respect to the base, and the portable computing device detachably assembled in the frame body; and
a lock set, located in the frame body, having a released position and a locked position with respect to the frame body, and including a second sensor,
when the lock set is in the released position, the portable computing device being capable of being detached from the frame body, and when lock set is in the locked position, the portable computing device being capable of being secured to the frame body;
wherein the control center detects the relative location between the first sensor and the second sensor and uses the relative location between the first sensor and the second sensor for controlling statuses of the input module and the portable computing device.

2. The electronic device according to claim 1, wherein when the portable computing device is placed in the frame body, the control center determines whether the lock set is in a locked position based on a relative position between the first sensor and the second sensor, and when the lock set is in the locked position, the control center controls the portable computing device to connect with the input module through wireless connection.

3. The electronic device according to claim 1, wherein when the portable computing device is placed in the frame body, the control center determines whether the lock set is in a locked position based on the relative position between the first sensor and the second sensor, and when the lock set is not in the locked position, the control center controls the portable computing device to terminate wireless connection with the input module.

4. The electronic device according to claim 1, wherein the base includes a third sensor and the control center obtains a relative location between the first sensor and the third sensor through the first sensor, and the control center use the relative location between the first sensor and the third sensor for determining and controlling statuses of the input module and the portable computing device.

5. The electronic device according to claim 4, wherein when the portable computing device is placed in the frame body, the control center determines whether the lock set is in a locked position based on the relative position between the first sensor and the second sensor and, when the lock set is in the locked position, the control center controls the portable computing device to connect with the input module through wireless connection.

6. The electronic device according to claim 5, wherein when the portable computing device is connected to the input module through the wireless connection, the control center determines whether the frame body is in an uncovered position based on the relative position between the first sensor and the third sensor and, when the frame body is in the uncovered position, the control center controls the portable computing device to run an initiate procedure and the input module to remain in an power-on stage.

7. The electronic device according to claim 5, wherein when the portable computing device is connected to the input module through the wireless connection, the control center determines whether the frame body is in an uncovered position based on the relative position between the first sensor and the third sensor and, when the frame body is not in the uncovered position, the control center controls the portable computing device to change the statuses of the input module and the portable computing device to standby mode.

8. The electronic device according to claim 4, wherein when the portable computing device is placed in the frame body, the control center determines whether the lock set is in a locked position based on the relative position between the first sensor and the second sensor and, when the lock set is not in the locked position, the control center controls the portable computing device to terminate wireless connection with the input module.

9. The electronic device according to claim 4, wherein the first sensor is a sensor for sensing magnetic force or a RFID tag, and the second sensor and the third sensor include a magnet or a RFID tag that are counterpart of the first sensor.

10. The electronic device according to claim 1, wherein the lock set is a zipper, the frame body has a holding slot and an opening which leads to the holding slot, the opening is exposed when the lock set is in the released position and the opening is closed when the lock set is in a locked position.

* * * * *